United States Patent [19]
Conruyt et al.

[11] 3,803,426
[45] Apr. 9, 1974

[54] HIGH SPEED LOGICAL GATES

[76] Inventors: Pierre Y. Conruyt, 3, Allee Claude Debussy, L'Hay-Les-Roses; Jean-Pierre Serrand, 46 Villa des Sorbiers, Poussy-Saint-Antoine, both of France

[22] Filed: Dec. 2, 1969

[21] Appl. No.: 881,386

[30] Foreign Application Priority Data

Dec. 3, 1968 France ............................ 68.176313

[52] U.S. Cl. ................................. 307/215, 307/218
[51] Int. Cl. ........................................... H03k 19/34
[58] Field of Search ........... 307/208, 213, 214, 215, 307/218; 333/32, 22

[56] References Cited

UNITED STATES PATENTS 3,329,835 7/1967 D'Agostino ..................... 307/218 X

*Primary Examiner*—Archie R. Borchelt
*Assistant Examiner*—T. N. Grigsby

[57] ABSTRACT

A NOR gate comprising a first module including a plurality of NPN inverter transistors having a common emitter resistor and a common collector resistor and bases respectively connected to input data terminals, a line stub of a given characteristic resistance having its input connected across said common emitter or collector resistor and a second module including a NPN emitter follower separator transistor having an emitter connected to the output data terminal of the gate, a base bias resistor connected across the output of said line stub, an emitter resistor and eventually a collector resistor, said common emitter or collector resistor and base bias resistor having both a resistance equal to the line stub characteristic resistance. A delay line may be optionally connected to the line stub for giving to the whole of the delay line and line stub a predetermined propagation time.

Thanks to this arrangement, which eliminates the influences of stray capacities in the transistors and their connections, the device is capable of operating at a very high speed.

2 Claims, 7 Drawing Figures

HIGH SPEED LOGICAL GATES

The present invention generally concerns logical gate modules having high operating speed and, more particularly, logical gate modules having large fan-in and fan-out power capability.

It is well known that high operating speed logical gates are often built up from NOR or NAND circuits. Such elementary circuits in fact allow to meet the performance requirements of UHF computers.

High speed logical gates must comply with several requirements. They must only comprise a few number of electronic components, transistors and resistors, having characteristics and values with small tolerances. The voltage level must be such that transistors do not saturate to minimize circuit turn-off time resulting from delays due to electric charge accumulation in the collector-base junction of the transistors. The transistors must have the highest possible cut-off frequency and are to be fed by a single power supply in order to avoid delays and decrease power dissipation. The resistors must have small resistance values for allowing miniaturization and preventing stray inductive and capacitive couplings.

Despite all these conditions, the operation of high speed logical gates is disturbed by wiring configurations when the delay in interconnection wire length is of the same order as rise-times. For example in UHF computers capable of digital data processing at a 1 GHz rate, deleterious effects are experienced as soon as the wire length exceeds two inches.

Attempts have been made to obviate these drawbacks by giving the resistors of the gates impedances near the characteristic impedance of the interconnection lines. Unfortunately, the duration of the transient down the interconnection lines cannot be sufficiently reduced because in the general case, the input and output impedance of a logical gate is not well defined and can vary from one gate to another, due to the fan-in and fan-out value actually used.

Another approach for preventing disturbances due to interconnection leads is to realize impedance matching of each logical gate to its interconnection leads. But this manner of proceeding increases and disperses the transit times of the signals in the computer which is deleterious both in synchronous and asynchronous computers.

The object of the invention is to provide high operating speed logical gates preventing transients in the interconnection lines.

Another object of the invention is to provide high operating speed logical gates exhibiting a well defined transit time for signals passing through the gate and the connection leads thereof.

Logical gates typically comprise a plurality of input inverting amplifiers or inverters and an output separator amplifier or separator. In the invention, the inverter assembly and the separator which in the prior art were in the same compact module, form two distinct modules with their own input and output terminals, interconnected by a transmission line stub having a well defined characteristic impedance, and the inverter assembly output impedance and the separator input impedance are given values both equal to the transmission line stub impedance.

Optionally a tapped delay line having the same characteristic impedance as the transmission line stub is serially connected thereto. Equalization of the transit times of a plurality of logical gates is achieved by giving the delay line a maximal delay $\tau$ equal to the delay of the longest interconnection line connecting an inverter assembly to a separator circuit. Thus, if the interconnection line has a length smaller than that of said longest line and has a delay $\tau_c$, the delay line is given a delay $\tau_r$ such that:

$$\tau_r + \tau_c = \tau$$

The invention will be now described in details with reference to the accompanying drawings in which.

Figure 1:
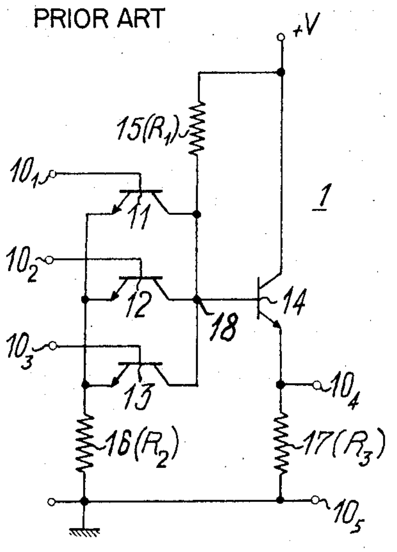
FIGS. 1 and 2 represent two embodiments of OR gates of the prior art.

Referring now to FIG. 1, the OR-gate 1 comprises inverter circuits, each formed by a transistor, respectively 11, 12, 13, the bases of which are respectively connected to input terminals $\mathbf{10_1}$, $\mathbf{10_2}$, $\mathbf{10_3}$. These transistors have a common emitter resistor 16 which is grounded. The collectors are connected to the same voltage source +V across a common collector resistor 15. The separator stage, common to all the inverter circuits is formed by a transistor 14 whose base is connected in parallel to the collectors of transistors 11, 12, 13 and whose collector is directly connected to voltage source +V. The emitter of transistor 14 is grounded through a resistor 17. The terminals of resistor 17 are the terminals of the OR-gate.

The transistors 11–14 are identical and are sorted on the basis of $V_{BE}$ which must not differ, between any two transistors, by more than 20 mV.

Figure 2:
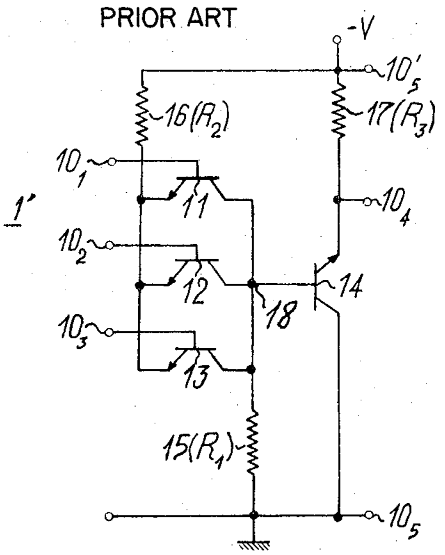

FIG. 2 shows an alternative embodiment of the gate of FIG. 1. Elements common to FIGS. 1 and 2 bear the same reference numerals.

Gate 1' is nothing other than gate 1 reversed end to end. The end of resistor 15 and the collector of transistor 14 are grounded and the terminal common to resistor 16 and 17 are brought to supply potential −V. The potential distribution is identical in FIGS. 1 and 2 except for a +V potential translation.

Figure 3:
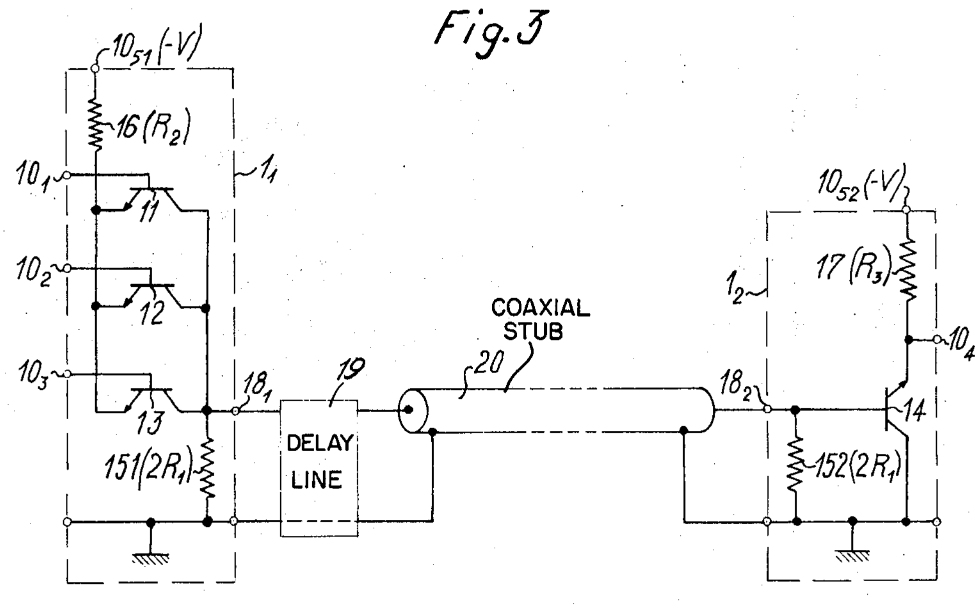
FIGS. 3 and 4 represent two embodiments of logical gates according to the invention.

FIG. 3 shows an improved OR-gate according to the invention. It derives from the gate of FIG. 2 and elements which in FIGS. 2 and 3 play the same part are given the same reference numerals.

The gate of FIG. 3 is severed into two parts $\mathbf{1_1}$ and $\mathbf{1_2}$. Part $\mathbf{1_1}$ is formed by input transistors 11, 12, 13 whose emitters are biased to potential −V across resistor 16 having a value $R_2$ equal to the value of resistor 16 in FIG. 2. The collectors are grounded via resistor 151 having a value of $2R_1$, two times that of resistor 15 in FIG. 2. Part $\mathbf{1_2}$ comprises the separator transistor 14 the base of which is connected to the collectors of transistors 11, 12, 13 through a coaxial stub 20 and is grounded through resistor 152 of value $2R_1$. The collector of separator transistor 14 is connected to feed-potential −V through resistor 17 having the same value $R_3$ as resistor 17 in FIG. 2.

Resistor 152 does not exist in the circuit of FIG. 2 but it is needed in the gate of the invention. As a matter of fact, the output $18_1$ of the inverter amplifier assembly $1_1$ is connected to the input $18_2$ of the separator stage through optional delay line 19 and interconnection line 20. These two lines have a characteristic impedance equal to $2R_1$ and since their two extremities are loaded by resistor 151 and 152 of value $2R_1$, they are substantially impedance matched at their two ends. Further there exists between ground and the collectors of transistors 11, 12, 13 on the one hand, and on the other hand between ground and the base of transistor 14 a resistance $R_1$ as in the case of FIG. 2, this resistance $R_1$ being due to two resistors in parallel having each a value $2R_1$.

By giving delay line 19 a suitable delay, as explained above, one is sure that pulse transmission between inputs $10_1$, $10_2$, $10_3$ and output $10_4$ lasts a predetermined time.

Delay line 19 is a distributed-parameter delay line which may be constituted by two parallel conductors of suitable resistivity on a semiconductor substrate.

The circuit of FIG. 3 allows the outer conductor of the interconnection coaxial line 20 to be at ground potential. But for applying potential −V to terminals $10_{51}$ and $10_{52}$ of parts $1_1$ and $1_2$ an additional wire is needed.

Figure 4:
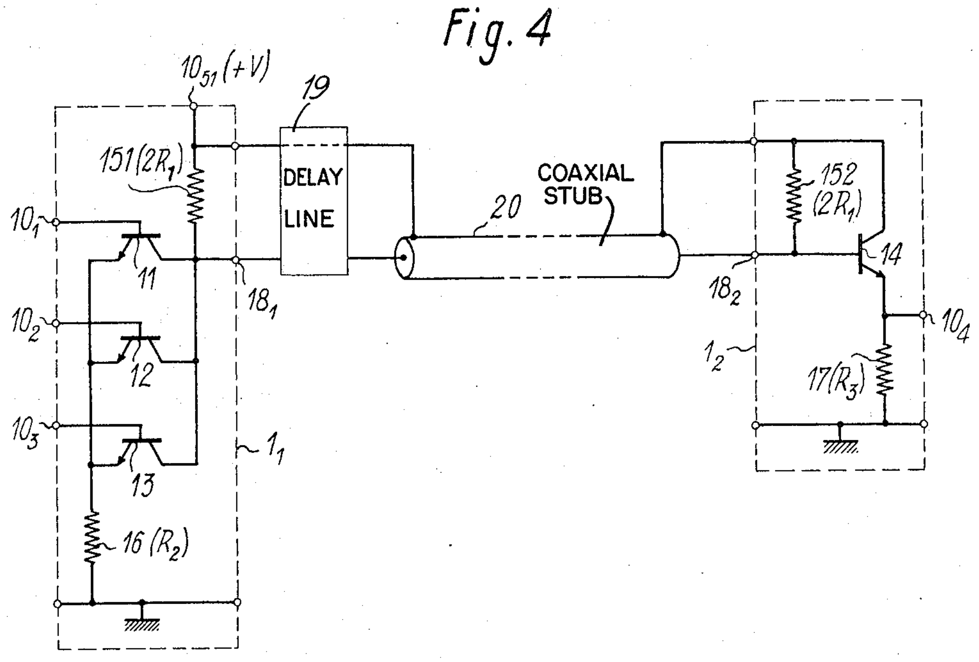

The circuit of FIG. 4 derives from the gate of FIG. 1 and it allows transistor 14 to be fed through the delay line 19 and the interconnection coaxial stub 20 the outer conductor of which is at potential +V. Elements common to FIGS. 1 and 4 bear the same reference numerals and no further explanation is needed.

Figure 5:
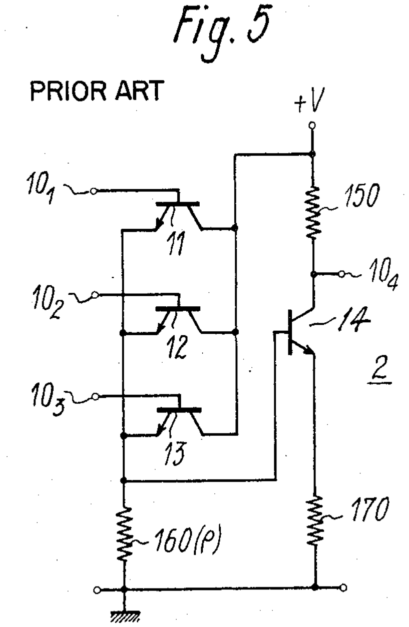
Fig. 5 PRIOR ART
FIG. 5 represents another embodiment of a prior art logical gate.

FIG. 5 shows a further fast response logical gate of the prior art. It differs from that of FIG. 1 by the fact that the base of separator transistor 14 is connected to the emitters of the inverter transistors and not to the collectors. The common emitter resistor 160 has a value $\rho$. The collector resistor 150 is no longer in the collector circuits of the inverter transistors but in the collector circuit of separator transistor 14. Emitter resistor 170 plays the same part as resistor 17.

Figure 6:
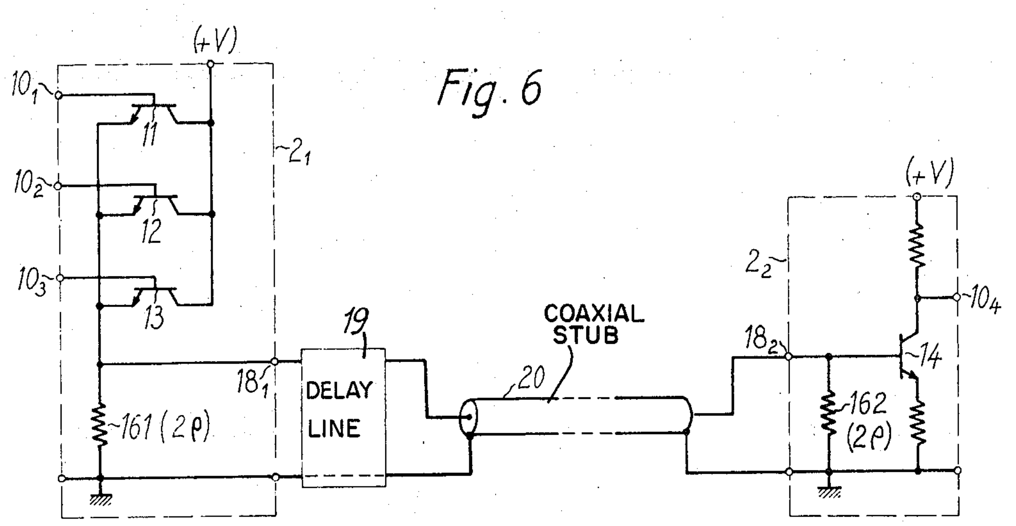
FIG. 6 represents a logical gate corresponding to that of FIG. 5 and modified according to the invention.

In FIG. 6, the gate of FIG. 5 is severed into two parts. Resistor 160 of value $\rho$ in FIG. 5 is replaced by resistor 161 of value $2\rho$ and the terminals of resistor 161 are connected to the delay line 19 followed by the coaxial stub 20. The inner conductor of stub 20 is connected to the base of separator transistor 14 and a resistor 162 of value $2\rho$ is connected between the base of 14 and ground. Coaxial stub 20 has a characteristic resistance equal to $2\rho$.

Figure 7:
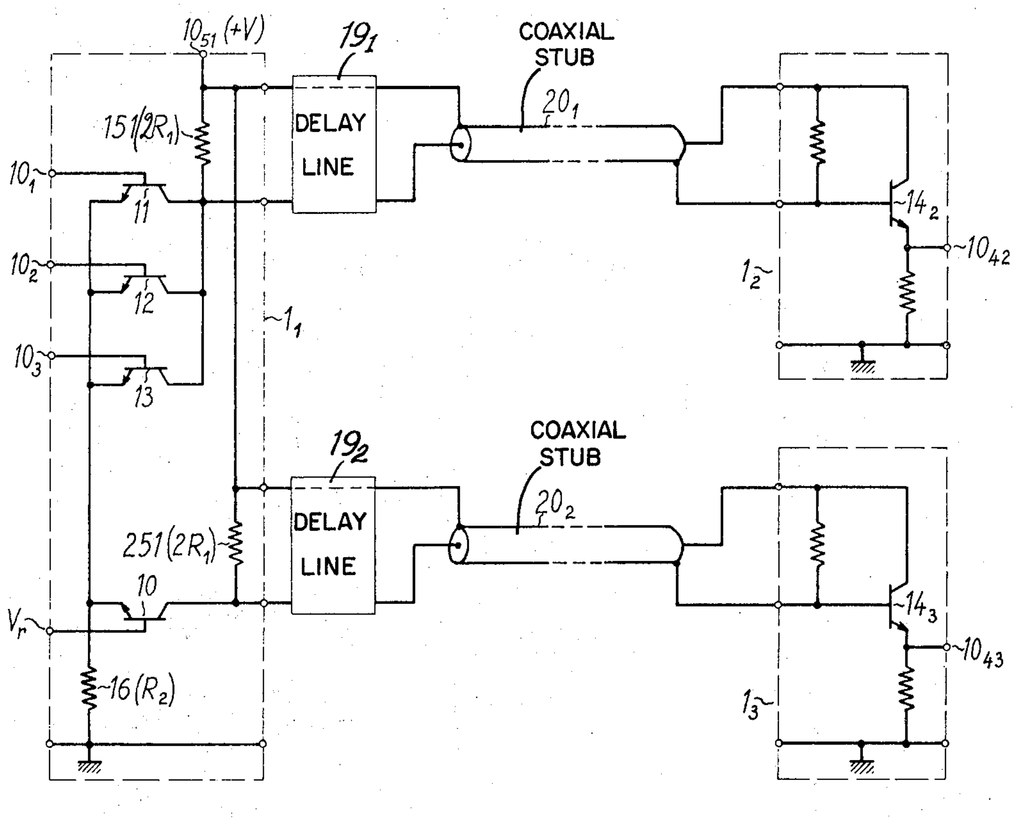
FIG. 7 shows an embodiment of the invention in which one inverter assembly module is connected to two separator modules.

FIG. 7 is a NOR and +OR gate according to the invention which provides A+B+C and $\overline{A+B+C} = \bar{A}.\bar{B}.\bar{C}$, A, B and C being three binary data. The gate comprises three modules $1_1$, $1_2$ and $1_3$. The first module $1_1$ comprises three NPN transistors 11, 12, 13 connected as in the case of FIG. 4 with a grounded common emitter resistor 16 of value $R_2$ and a common collector resistor 151 of value $2R_1$. A fourth transistor 10 has resistor 16 as its emitter resistor but a separate collector resistor 251, also of value $2R_1$. Resistor 151 is connected at the input of the channel formed by delay line $19_1$ and coaxial stub $20_1$ and resistor 251 at the input of the channel formed by delay line $19_2$ and coaxial stub $20_2$. Lines $19_1$, $20_1$, $19_2$, $20_2$ have a common characteristic resistance equal to $2R_1$.

At the ends of coaxial stubs $20_1$ and $20_2$, there are connected two separate modules, $1_2$ with transistor $14_2$ and NOR output $10_{42}$ and $1_3$ with transistor $14_3$ and OR output $10_{43}$. The separator modules $1_2$ and $1_3$ are identical to module $1_2$ in FIG. 4; the collector and the base of transistor $14_2$ and $14_3$ are connected through a resistor of value equal to the characteristic resistance of the coaxial stubs.

The base of transistor 10 is biased by a voltage $V_r$ and, if $E_0$ and $E_1$ designate the voltage amplitude of the zero and one bits applied to terminals $10_1$, $10_2$, $10_3$, the quantity $V_r$ is equal to the mean value $\frac{1}{2}(E_0 + E_1)$. The +V collector voltage applied to terminal $10_{51}$ is given a suitable value for transistor 10 being blocked when a one bit of amplitude $E_1$ is applied to the base of any one transistor 11 to 13. Then the input transistor concerned is passing and a zero bit appears at terminal $10_{42}$ while a one bit appears at terminal $10_{43}$. When a zero bit is applied to the base of any one transistor 11 to 13, this transistor is blocked and transistor 10 is passing. A one bit appears at terminal $10_{42}$ and a zero bit at terminal $10_{43}$.

In a fan-in and fan-out proposition of the prior art, NOR gates of the type of FIG. 1 but in which resistor 17 is omitted are connected in parallel by their terminals $10_4$ at the input of a line stub which is terminated on its characteristic impedance. In this arrangement, the fan-out loads are to be distributed with a determined spacing. An uneven distribution of loads will cause reflections that can be serious and will result in the propagation of erroneous data. In the invention arrangement, the inverter transistors and the separator transistor are respectively in two modules connected therebetween by a line stub which is matched in impedance at its two ends, respectively by the common emitter or collector resistor of the inverter transistors and the base bias resistor of the separator transistor. These two resistors are equal to the characteristic impedance of the connection line. The operation of the gate of the invention is more independent of the sortance variation than the prior art gates. The time delays on and off are improved, say 0.7 to 0.8 ns instead of 1.4 to 1.5 ns in the prior art.

The line stub shown in the figures as a coaxial stub may also be a stub of any type of line commonly used in computers, bifilar, twin-lead . . .

What we claim is:

1. A NOR logical gate comprising a first module including a plurality of NPN inverter transistors having a common emitter resistor and a common collector resistor and bases respectively connected to input binary data terminals, a line stub of a given characteristic resistance having its input connected across said common emitter resistor and a second module including a NPN emitter follower separator transistor having an emitter connected to the output data terminal of the gate, a base bias resistor connected across the output of said line stub, an emitter resistor and a collector resistor, said common emitter resistor and said bias resistor both having a resistance equal to the line stub characteristic resistance.

2. A NOR logical gate comprising a first module including a plurality of NPN inverter transistors having a common emitter resistor and a common collector resistor and bases respectively connected to input binary data terminals, a delay line of a given characteristic resistance, a line stub having a characteristic resistance equal to that of the delay line and connected thereto, said delay line having its input connected across said common emitter resistor and the cumulated propagation time in said delay line and line stub being equal to a predetermined value, and a second module including a NPN emitter follower separator transistor having an emitter connected to the output data terminal of the gate, a base bias resistor connected across the output of said line stub, an emitter resistor and a collector resistor, said common emitter resistor and said bias resistor both having a resistance equal to the delay line and line stub characteristic resistance.

* * * * *